(12) United States Patent
Felke et al.

(10) Patent No.: US 6,748,304 B2
(45) Date of Patent: Jun. 8, 2004

(54) METHOD AND APPARATUS FOR IMPROVING FAULT ISOLATION

(75) Inventors: Timothy J. Felke, Glendale, AZ (US); David M. Kolbet, Glendale, AZ (US); John F. Stone, Mesa, AZ (US); Jeff J. van der Zweep, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/222,397

(22) Filed: Aug. 16, 2002

(65) Prior Publication Data

US 2004/0034456 A1 Feb. 19, 2004

(51) Int. Cl.[7] .............................................. G06F 19/00
(52) U.S. Cl. ...................................................... 701/29
(58) Field of Search ........................ 701/29–31, 33–35; 340/945

(56) References Cited

U.S. PATENT DOCUMENTS

| 5,521,842 | A | 5/1996 | Yamada |
| 5,544,308 | A | 8/1996 | Giordano et al. |
| 5,870,768 | A | 2/1999 | Hekmatpour |
| 6,122,575 | A | 9/2000 | Schmidt et al. |
| 6,125,312 | A | 9/2000 | Nguyen et al. |
| 6,253,147 | B1 | 6/2001 | Greenstein |
| 6,314,422 | B1 * | 11/2001 | Barker et al. ................. 707/10 |

FOREIGN PATENT DOCUMENTS

| EP | 0355968 A | 2/1990 |
| EP | 1072991 A2 | 1/2001 |
| EP | 1079204 A1 | 2/2001 |
| GB | 2312518 A | 10/1997 |
| WO | WO 0131411 A | 5/2001 |

OTHER PUBLICATIONS

Kipersztok et al (US 2002/0138184).*
Nachlas et al "Diagnostic–Strategy Selection for Series Systems", IEEE transactions on reliability, vol.39, No. 3, Aug. 1990.*
An Article entitled "An Optimizing System For Troubleshooting" by Tim Felke, Garrett Controls, Tucson, AZ. CH2596–5/88/0000–1232 1988 IEEE.

* cited by examiner

Primary Examiner—Thu V. Nguyen

(57) ABSTRACT

A method for improving fault isolation for failure modes in complex systems, and a software program embodying the method or a corresponding method together with a computer based aircraft diagnostic system using such software is described. The method includes: capturing a set of symptoms that is consistent with a failure mode of the complex system; identifying a set of repairs for the complex system that are consistent with the set of symptoms; ranking, when the set of repairs includes more than one repair, the repairs in a sequence that will minimize an average cost to repair the complex system, the sequence including a historical component and reflecting the effectiveness of available test results to resolve each the repairs; determining possible tests that are consistent with the failure mode; and ranking the possible tests according to there respective net improvement in the average cost to repair the complex system.

19 Claims, 3 Drawing Sheets

METHOD AND APPARATUS FOR IMPROVING FAULT ISOLATION

FIELD OF THE INVENTION

This invention relates to maintenance and service of complex systems and more specifically methods and apparatus for improving fault isolation for such systems.

BACKGROUND OF THE INVENTION

Complex systems comprising tens or hundreds of inter-related and inter-operating systems and subsystems, many which may be complex in their own right, present unique maintenance and service challenges. Examples of such complex systems include factories, major buildings, ocean-going vessels, power generation plants, and aircraft to name a few. Complex systems and the inter-related and inter-operational nature of the systems and subsystems thereof often require equally complex and disciplined maintenance and service programs. These programs usually include documentation or records of observed or indicated irregularities or discrepancies and actions taken or services performed pursuant to resolution or prevention of such irregularities and discrepancies. This documentation is usually filled out, completed, or recorded by service and maintenance personnel. Expert systems and tools that can standardize service and maintenance documentation, diagnoses, procedures, cost estimates and so on are highly desirable for the time savings and precision they can offer to an overall maintenance and operational support program.

In the aircraft industry, for example, fault models that include inter alia fault codes as a means to summarize the set of symptoms or standard observations that are expected to be present for each distinct fault condition in a particular type of aircraft have more recently been used. A fault code typically corresponds to a fault condition in a single system on the aircraft and is often used as the basis of diagnostic endeavors, including fault classification and fault isolation, material planning, cost estimation, and deferral/criticality analysis. Thus Fault Codes are a critical element of the Fault Model for an aircraft where a model is used to support an automated diagnostic and maintenance support system. Equally critical therefore is determining the proper fault code for the aircraft when presented with a discrepancy and set of symptoms or a given fault condition. Finding or determining or selecting the proper fault code based on readily apparent symptoms or observations is referred to as fault classification.

Given the fault code, using additional symptoms, only available as test results, to determine the best repair is called fault isolation. Presently airline personnel or technicians often perform the fault isolation activity using documented Fault Isolation Procedures or through their individual knowledge of the aircraft systems involved. Use of these Fault Isolation Procedures by themselves is inadequate because the complexity of the system allows for a much greater variety of failure modes than can be anticipated by the author of the Procedures document. Reliance on the expertise of the technician is inadequate since the technician may be called upon to service 100's of different aircraft in a year, each of which are substantially different, such as a Boeing 757 and Airbus A320, or have significant variation, such as the differences between the 757-27A and the 757-27B sub-fleets. A typical US airline will have several major fleets and a dozen or more sub-fleets. In addition, the configuration of the aircraft changes over time to incorporate safety, reliability and passenger comfort improvements. These changes are incorporated over a period of time thereby resulting in further ambiguity for the technician trying to analyze an aircraft fault condition without support.

Other systems for automated support of Fault Isolation such as those available from Boeing, often referred to as PMA in the industry and Airbus, typically referred to as CATS, help to identify the fault isolation diagram (tree) to use but do not provide a mechanism for incorporating experience into this decision or to effectively modify the decision tree itself based on this experience. Thus fault isolation remains a very time consuming and error prone activity that adds complexity to the diagnostic and service procedures, increases costs, and reduces the precision of planning and cost analysis activities. Clearly a need exists for methods and apparatus for improving fault isolation for complex systems, such as aircraft, preferably methods and apparatus that incorporate experience into such methods and apparatus.

SUMMARY OF THE INVENTION

The present invention in varying scope is a method and apparatus for improving fault isolation for failure modes in complex systems. One aspect of the invention is a software program comprising software instructions arranged to run on a processor to improve fault isolation for failure modes in a complex system, the software program when installed and operating on a processor resulting in the processor performing an inventive method of fault isolation. Another aspect according to the invention is a computer based aircraft maintenance and operations diagnostic system for improved assistance with fault isolation for a fault condition within an aircraft based on a fault model for the aircraft, the computer utilizing an inventive embodiment of a fault isolation software program to performs another inventive method of fault isolation.

In one aspect the method includes the steps of: capturing a set of symptoms that is consistent with a failure mode of the complex system; identifying a set of repairs for the complex system that are consistent with the set of symptoms; ranking, when the set of repairs includes more than one repair, the repairs in a sequence that will minimize an average cost to repair the complex system, the sequence including a historical component and reflecting the effectiveness of available test results to resolve each of said set of repairs; determining possible tests that are consistent with the failure mode; and ranking the possible tests according to there respective net improvement in the average cost to repair the complex system.

In narrower scope one aspect of the method includes selecting a test and obtaining a test result from the possible tests and repeating, using the set of symptoms, the test result, and any additional test results for tests that will be selected, the steps of identifying, ranking the set of repairs, determining the possible tests, ranking the possible tests and selecting further tests until the set includes only one repair and then reporting this repair. The process of capturing the set of symptoms, preferably, includes using a standard code as an indication of a set of standard observations corresponding to a subset of observable symptoms from the set of symptoms, the standard observations selected from a standard observations list and wherein the possible tests correspond to the standard code and wherein the step of identifying the set of the repairs includes identifying a list of repairs corresponding to the standard code for the set of symptoms. Preferably ranking the repairs further uses an assessment of experience with the set of symptoms occurring with each repair of the set of said repairs, whether the available test results indict, acquit, or are silent with respect to each repair, and a cost associated with each repair. Ranking the possible tests, preferably, uses an algorithm to rank the possible tests according to a value of the possible test that is dependent on a reduction in the average cost minus a cost to conduct the possible test.

The software program is particularly suitable for use within a diagnostic tool for application to complex systems. In one aspect, using an embodiment of the software program, the invention is an aircraft maintenance and operations diagnostic system for improved assistance with fault isolation for a fault condition within an aircraft based on a fault model for the aircraft, where the system comprises: a user interface; a computer, coupled to the user interface, having memory for storing software instructions and databases and a processor for; executing the software instructions to process information to facilitate the fault classification for the fault condition according to the fault model, the software instructions resulting in the computer: capturing a fault code from a fault classification process, the fault code being part of the fault model that is consistent with the fault condition; identifying a set of repairs for the complex system that are consistent with the fault code; ranking, when the set of repairs includes more than one repair, the repairs in a sequence that will minimize an average cost to repair the aircraft, the sequence including a historical component and reflecting the efficacy of available test results in resolving each repair; determining possible tests that are consistent with the fault code; and ranking the possible tests according to there respective net improvement in the average cost to repair the aircraft.

The above system in further inventive and narrower scope further includes a process of selecting a test and obtaining a test result from the possible tests and repeating, using the fault code, the test result, and any test results from additional tests that will be selected, the identifying, the ranking the set of repairs, the determining the possible tests, the ranking the possible tests and selecting further tests until the set includes only one repair and then reporting this repair. Capturing the fault code, preferably, includes capturing an associated set of standard observations corresponding to a subset of observable symptoms, the standard observations selected from a standard observations list and capturing any available test outcomes. Preferably, ranking the repairs further uses an assessment of experience with a set of symptoms, corresponding to observable symptoms associated with the fault code and any available test outcomes, occurring with each repair of the set of the repairs, whether the available test results indict, acquit, or are silent with respect to each repair, and a cost associated with each repair. Ranking the possible tests, preferably, uses an algorithm to rank the possible tests according to a value of the possible test that is dependent on a reduction in the average cost minus a cost to conduct the possible test. The system preferably further utilizes the user interface for displaying the possible tests, as ranked, to a user or remote user for reviewing and selecting a possible test.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

Figure 1:
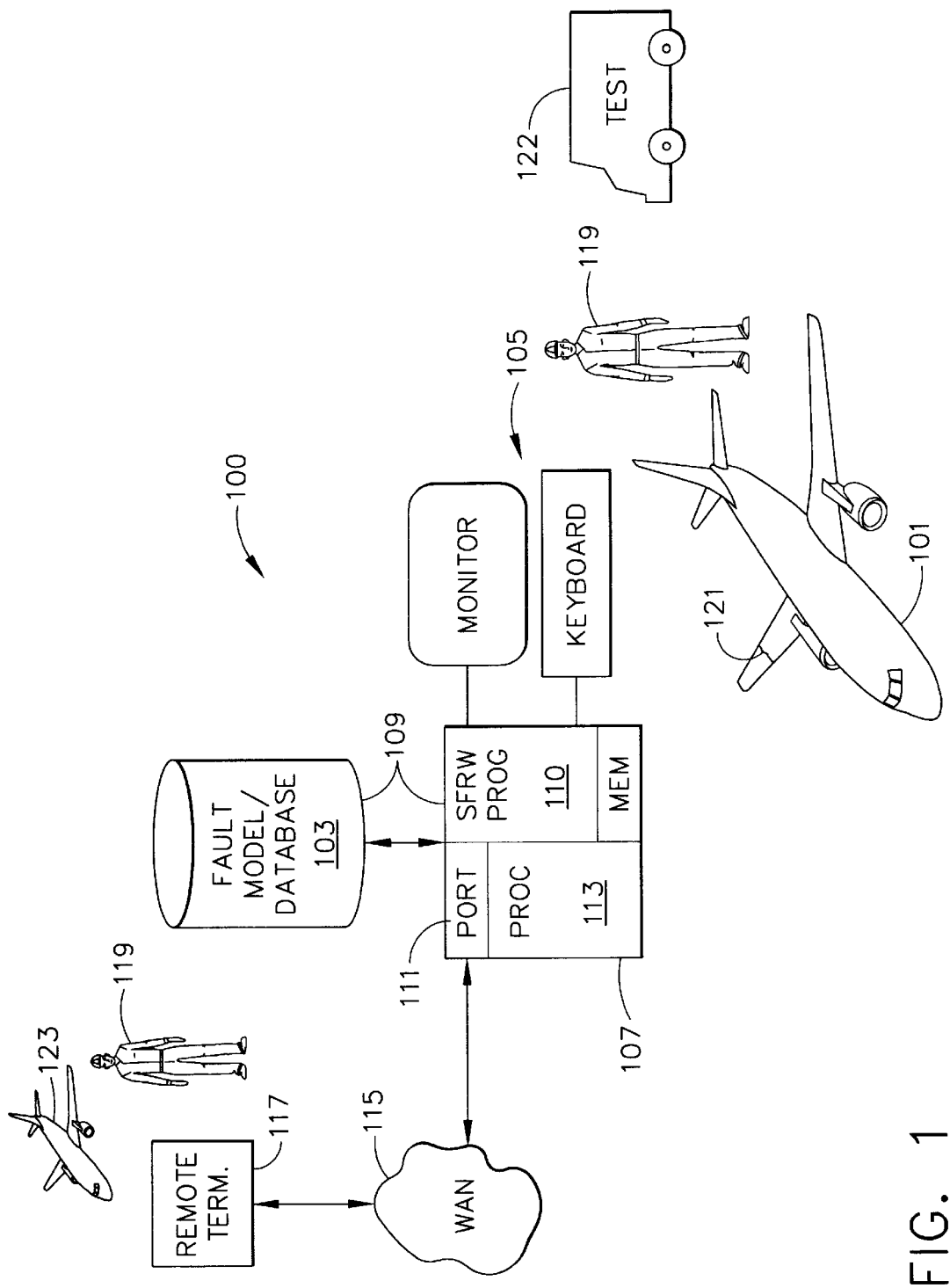
FIG. 1 depicts, in an exemplary form, a functional block diagram of a preferred computer based diagnostic system for facilitating fault isolation in a complex system according to the present invention.

In overview form the present disclosure concerns and relates to systems for service, maintenance, and diagnostic support of complex systems and more specifically the disclosure relates to inventive methods and apparatus for assisting with fault isolation for fault conditions or failure modes within such systems that incorporate historical diagnostic information. More particularly various inventive concepts and principles embodied in methods and apparatus for efficiently and systematically determining the proper fault isolation for complex systems are discussed. The complex systems of particular interest are those associated with aircraft, however the concepts and principles discussed herein will be equally applicable to other complex systems such as those noted earlier.

As further discussed below various inventive principles and combinations thereof are advantageously employed to improve diagnostic efforts, specifically fault isolation in a manner that incorporates and thus learns from historical diagnostic, classification, or isolation information, such as previous diagnoses of similar fault conditions or failure modes. This data is, preferably, incorporated into fault models for the relevant systems, thus alleviating various problems, such as imprecise service and maintenance actions and descriptions, inflexibility or lack of adaptability, and the excess costs associated with known systems while still facilitating quality service, maintenance, and diagnostic activities and more precise labor, time, and cost estimates that will result from the more systematic isolation of faults and thus forecasts of requisite repair procedures and actions that are enabled by appropriate and consistent fault isolation.

The instant disclosure is provided to further explain in an enabling fashion methodologies and techniques for making and using various embodiments in accordance with the present invention as well as the best modes of practicing the invention as contemplated by the inventor. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, in the interest of brevity and minimization of any risk of obscuring the principles and concepts according to the present invention, further discussion of such software, if any, will be limited to higher level principles and concepts as employed or applied to the preferred embodiments.

FIG. 1 depicts, in an exemplary form, a functional block diagram of a preferred computer based diagnostic system, in a contextual and exemplary environment, for facilitating fault isolation in a complex system according to the present invention. More particularly, an aircraft maintenance and operations diagnostic system 100 for improved assistance with fault isolation for a fault condition within an aircraft 101 based on a fault model 103 for the aircraft is shown. The system is computer based and includes a user interface 105, such as a conventional keyboard and monitor and possibly means (not shown) for coupling to separate systems for downloading failure mode or condition relevant data such as observed symptoms or test results. Further included is a known computer 107 that is coupled to the user interface and has memory 109 for storing software instructions 110 and databases including the fault model and database 103, preferably a port 111 and a processor 113. The port is suitable for coupling to a Wide Area Network (WAN) 115 such as the PSTN or Internet to provide access to the system 100 from a remote terminal 117. Generally the system 100 is arranged and constructed so that a technician 119 or maintenance and diagnostic personnel can conduct tests relevant to a discrepancy 121, using the exemplary test cart 122, and interact with the system via the user interface to arrive at the proper fault isolation, thus repair and maintenance procedures and the like. Similarly a technician 119 at a remote terminal or remote user could interact with the system 100 and be provided diagnostic support there from in order to make appropriate fault isolations for remote aircraft 123. In fact the aircraft may be partially diagnosed or diagnosed at one site and finally diagnosed at another.

In the interest of developing some common conventions we will briefly review fault models and fault classification and isolation conventions. A Fault Model 103 for an aircraft or other complex system, preferably, is a relational database that identifies the failure modes of the aircraft and the symptoms that each failure mode or fault condition produces. The symptoms are defined as either Observations or Test Results. Observations are the set of symptoms that are readily apparent to a technician 119 without running a test procedure or attaching supplemental equipment, such as the test cart 122, to the aircraft or other complex system. Test Results are the set of symptoms that can only be discovered by running a test procedure or attaching supplemental equipment to the aircraft Fault Classification only uses Observations to determine the Fault Code. An inventive method and apparatus for fault classification is disclosed in copending patent application titled METHOD AND APPARATUS FOR IMPROVING FAULT CLASSIFICATIONS, Ser. No. 10/122,041, by Felke et al. assigned to Honeywell International. Inc., which application is incorporated herein by reference in its entirety. As noted earlier fault codes are a means to summarize the set of symptoms or syndrome reported for each distinct fault condition or failure mode. Given a previously and properly determined fault code, fault isolation uses test results to determine the best repair sequence and methodology.

The Fault Classification approach preferably used by the system 100 uses the fault model 103 to provide aircraft by aircraft specific information that allows the Isolation Software to be used for many different types of aircraft. In this scheme, each type of aircraft has a distinct Fault Model that identifies the Failure Modes, Observations, Test Procedures, Repairs, and Fault Codes that are defined for that aircraft type. The Fault Model may also contain various statistical information concerning the occurrence rates of each Failure Mode and the co-occurrence rates between the Fault Model entities in order to determine the information optimal activities to Support Fault Classification and Fault Isolation.

With that, the processor 113 executes the software program 109 or instructions to process information to facilitate the fault isolation for the fault condition or failure mode according to the fault model 103. Executing the software program results in the computer capturing a fault code from a fault classification process, the fault code being part of the fault model that is consistent with the fault condition. This may also be referred to as reporting the fault code to the computer or system. The most common mechanism is simply capturing the fault code from an earlier classification activity however it its conceivable for the fault code and other fault model relevant data to be reported by means of the data interface in order to allow such information to be provided or generated by a secondary system. One should note that a fault code will be associated with an observation signature or set of standardized observations corresponding to discrepancies and that a multiplicity of repairs, with likely different indicated test procedures, are likely to be associated with the same fault code. An exemplary fault code or fault code description would be "Engine Won't Start", "Starter Does Turn" and "Fuel Indication is Normal". Thus by capturing the fault code we have captured an associated set of standard observations corresponding to a subset of observable symptoms, where the standard observations are selected from a standard observations list. Also, preferably, any symptoms that are not observable but never the less available such as any available test outcomes are also captured or provided to the computer.

Then identifying a set of repairs for the aircraft that are consistent with the fault code is performed. Identifying the set of fault codes is performed by the computer or processor automatically identifying the repairs associated with the fault code identified by the classification activities and captured above, less any such repairs that may have been ruled out by available test results or outcomes.

Next, whenever the set of repairs includes more than one, ranking the repairs in a sequence that will minimize an average cost to repair the aircraft, the sequence including or dependent on one or more historical components or factors as well as the ability or effectiveness of available test results to resolve (point toward or indict, point away from or acquit, or provide no information or silent) each of the repairs is undertaken. Preferably, ranking the repairs further uses an assessment of experience with a set of symptoms, corresponding to observable symptoms associated with the fault code and any available test outcomes, occurring with each repair of the set of the repairs, whether the available test results indict, acquit, or are silent with respect to each repair, as well as a cost associated with each repair. The ranking process is preferably accomplished using various additional concepts and constructs in conjunction with the fault model and the algorithm further explained below.

Figure 2:
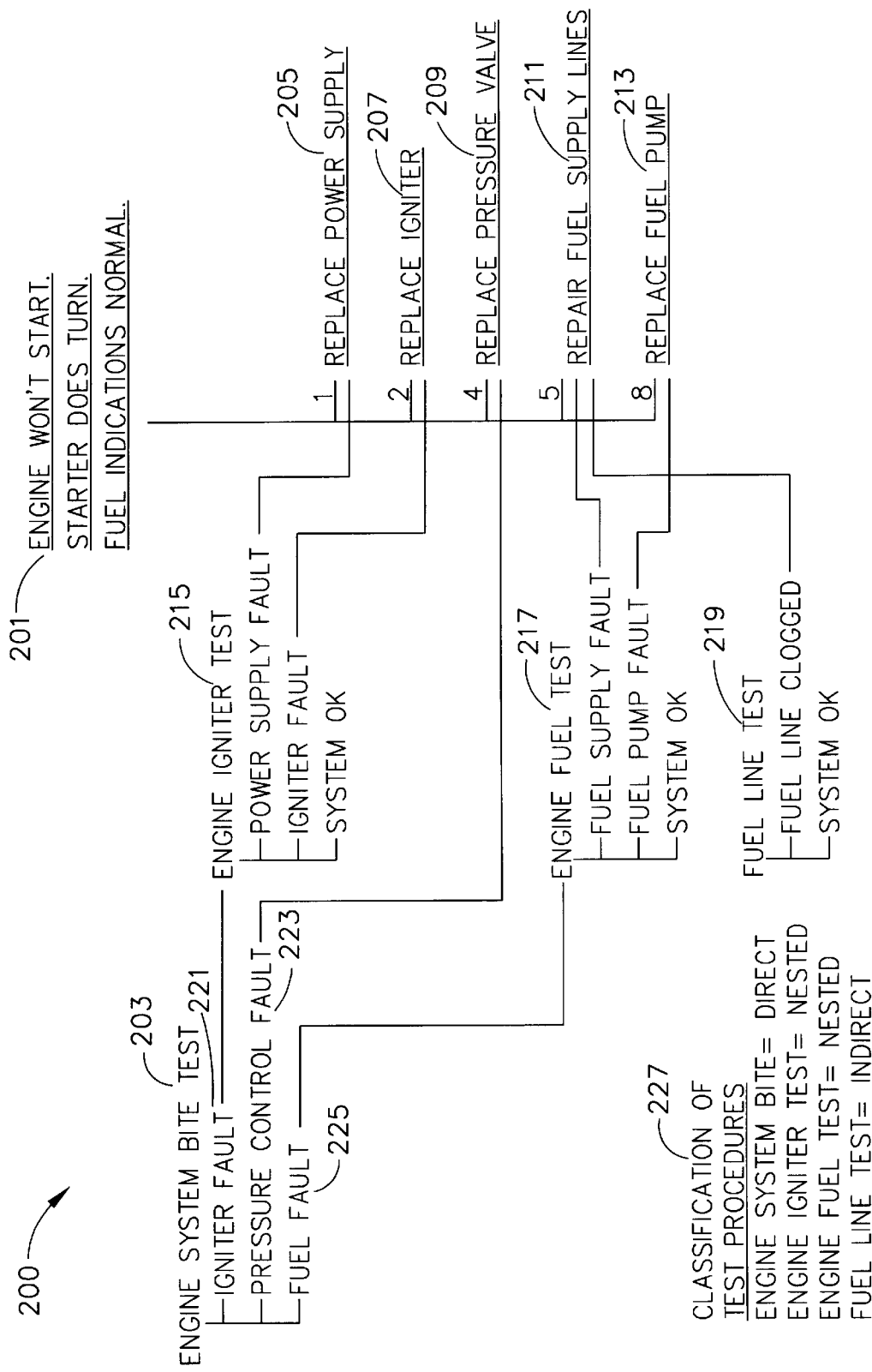
FIG. 2 depicts an exemplary data set for use in illustrating the operation of the diagnostic system of FIG. 1 according to the present invention.

Once the Fault Code is known, the algorithm described herein uses the Fault Model and various fault model entities to determine the optimal sequence of Tests or Repairs to rectify the fault condition at minimal cost or in minimal time depending on the preference of the user. Referring to FIG. 2 an exemplary data set 200 will be used to illustrate the processes described below. The first step in the ranking process given that we have determined which fault conditions or faults (represented by their prescribed repairs or repair action) are associated with or can explain all or some of the current symptoms is to determine the relative likelihood of each candidate repair or fault. The algorithm determines how many of the previous occurrences of each fault condition or repair produced the symptom values (Observations Present/Absent & Test Outcomes) for all of the currently known symptom results. In FIG. 2, the Fault Code 201 that is reported has and depicts a direct link to the test, Engine System BITE 203 and the following repairs: Replace Power Supply, Replace Igniter, Replace Pressure Valve, Repair Fuel Lines, and Replace Fuel Pump 205–213. This data, in the fault model, is derived from existing maintenance procedures for the fault code using Document to Knowledge technology as disclosed in a co-pending PCT application PCT/US01/07652 titled Trainable, Extensible, Automated Data-To-Knowledge Translator by Kramer et al. and assigned to the same assignee as here or alternatively developed and entered or authored directly into the fault model by responsible personnel designated by the operator.

In this example the tests "Engine Igniter Test" 215, "Engine Fuel Test" 217 and "Fuel Line Test" 217 are also identified. The "Engine Igniter Test" and "Engine Fuel Test" are associated with specific outcomes, specifically Igniter Fault 221 and Fuel Fault 225, of the "Engine System BITE Test" 203. When reading the documented instructions for the "Engine System BITE Test", the user would be presented with directions for the set-up of the test and test equipment and subsequent inspection of the Engine System (not shown) to determine which one of the possible tests outcomes is manifest or has occurred. An example would be to engage the starter and then push a System BITE Test Button on an Engine Controller. The outcomes of this test would include the following: "Igniter Fault" 221, "Pressure Control Fault" 223 and "Fuel Fault" 225 as manifest or shown on the Engine Controller Display. In the procedure for the Engine System BITE test, the user would be instructed to perform the "Engine Igniter Test" 215 if the readout is equal to "Igniter Fault", they would be instructed to "Replace the Pressure Valve" 209 if the readout is equal to "Pressure Control Fault" and they would be instructed to perform the "Engine Fuel Test" 217 if the readout is equal to "Fuel Fault". It is important to note the example data contains a fourth test procedure, "Fuel Line Test" 219 that is not directly linked to the Fault Code 201 or reachable through any of its outcomes. This test would typically be called out in a different part of the Maintenance Manuals but it is recognized by the algorithms as relevant since it can "Indict" (point toward or indicate) or "Acquit" (point away from or not indicate) one or more of the Failure Modes or Repairs linked to the Fault Code.

The algorithms for fault Isolation described in this disclosure classify the test procedures 227 as "Direct", "Nested" or "Indirect". In the example data, the test "Engine System BITE" is classified as "Direct" since it is directly linked to the Fault Code, the tests "Engine Igniter Test" and "Engine Fuel Test" are classified as "Nested" since they are reachable by following all of the possible Outcomes of all of the "Direct" tests, and the test "Fuel Line Test" is classified as "Indirect" since it is not "Direct" or "Nested" but it does indict or acquit one or more of the Failure Modes associated with the Fault Code. Before any tests are run, the algorithm ranks the possible Repairs by their Co-Occurrence Count with the Fault Code which is an indication of the number of times that the Fault Code has been corrected by performing the associated Repair. The Co-Occurrence Count for each Failure Mode associated with a Fault Code is recorded in the Fault Model and is incremented whenever a Repair is verified to have corrected a reported Fault Code. In our example data, the Co-Occurrence counts for each repair are 1,2,4,5, and 8 as indicated on the drawing. This information is used to compute the likelihood of each repair (in the absence of any test results) using the following formula:

$$Likelihood_x = Co\text{-}Occurrence_x / Sum(Co\text{-}Occurrence_{i \ldots z})$$

This formula results in the following ranking: where 1,2,4,5, and 8 are respectively divided by the sum or 20:

Replace Fuel Pump=0.40

Repair Fuel Supply Lines=0.25

Replace Pressure Valve=0.20

Replace Igniter=0.10

Replace Power Supply=0.05

When a test is performed and a test outcome is reported, the algorithm separates the set of possible repairs (Failure Modes) according to how effective the test results are at resolving each repair, specifically into three subsets: those that are Indicted or pointed toward by the Test-Outcome, those that are Acquitted or not pointed toward or indicated by the Test-Outcome and those for which the test is silent or provides no information. The repair ranking algorithm described in this disclosure ensures that the ranking of all repairs that are Indicted by the outcome are scored higher than those for which the test is silent and that the repairs for which the test is silent are ranked higher than those that are Acquitted by the test. This is required to ensure a reasonable answer for those occasions when for various reasons a test is run out of its normal sequence.

In the example data set, if the test "Engine Igniter Test" were run as the first test procedure and the result was "Igniter Fault", we would expect that the repair "Replace the Igniter" would be ranked highest since it is indicted by the reported outcome, the Repairs "Replace the Pressure Valve", "Repair the Fuel Supply Lines" and "Replace Fuel Pump" would be ranked in the middle since the test is silent on these repairs, and the repair "Replace Power Supply" would be ranked lowest since this repair is associated with an outcome of the test that was not reported.

The algorithm identifies two ratios that it will use to adjust the likelihoods of the repairs depending on their membership in one of the three sets identified above (Indicted, Acquitted, Silent). The first ratio, indict_promote is the amount that each indicted repair needs to be promoted in order to ensure it scores higher than all of the repairs belonging to the acquitted or silent sets. This value is calculated as:

$$Indict\_Promote = 2*Max(Co\text{-}Occurrence\ for\ Non\text{-}Indicted) / Min(Co\text{-}Occurrence\ for\ all\ Indicted)$$

The second ratio, acquit_demote is the amount that each acquitted repair needs to be demoted in order to ensure it scores lower than all of the repairs belonging to the silent set (if any). This value is calculated as:

$$Aquit\_Demote = Min(Co\text{-}Occurrence\ for\ Silent) / 2*Max(Co\text{-}Occurrence\ for\ all\ Acquitted)$$

$$Aquit\_Demote = Min(Acquit\_Demote, 0.5);\ \text{Demote should always reduce the support by at least 0.5}$$

$$Aquit\_Demote = 0.5\ \text{if there are no Repairs for which the reported tests are Silent}$$

Using these values, the Supported_Occurrences for each repair are calculated as:

Supported_Occurrences$_i$=Co_Occurrence$_i$*Aquit_Demote if this repair is acquitted.

Supported_Occurrences$_i$=Co_Occurrence$_i$*Indict_Promote if this repair is indicted.

Supported_Occurrences$_i$=Co_Occurrence$_i$ otherwise.

The relative likelihood's for each possible Failure Mode (Repair) can be computed as:

Likelihood$_x$=Supported_Occurrences$_x$/Sum(Supported_Occurrences$_{i...z}$)

For our example data, if the "Engine Igniter Test" were run and the "Igniter Fault" outcome were reported, we would get the following results from the calculation:

Indict_Promote=2*Max(10)/Min(2)=10;

Aquit_Demote=Min (Min(10)/2*Max(1), 0.5)=0.5;

Support_Occurrence Calculations:
Replace Power Supply=1*0.5=0.5;
Replace Igniter=2*10=20;
Replace Pressure Valve=4*1=4;
Repair Fuel Supply Lines=5*1=5;
Replace Fuel Pump=10*1=10;
Repair Likelihood Calculations:
Sum(all Repairs)=39.5
Replace Power Supply=0.01
Replace Igniter=2*10=0.50;
Replace Pressure Valve=0.11
Repair Fuel Supply Lines=0.13
Replace Fuel Pump=10*1=0.25

The algorithm must be modified to gracefully handle the case that multiple tests have been run. The count of the times that each repair is in each of the outcome implication sets (i.e. Indict, Acquit, Silent) is computed to support an updated formula. In this model, a repair may be indicted by one test, acquitted by another and treated as silent by a third. The updated version of the formulas is as follows:

Indict_Promote=2*Max(Co-Occurrence for Non-Indicted)/Min(Co-Occurrence for all Indicted)

Where the Non-Indicted set is the set of Repairs that are Acquitted or Silent for at least one reported Test Outcome and the Indicted set is the set of all Repairs indicted by at least one reported Test Outcome.

Aquit_Demote=Min(Co-Occurrence for Silent)/2*Max(Co-Occurrence for all Acquitted)

Aquit_Demote=Min(Acquit_Demote, 0.5); Demote always reduces the support by at least 0.5

Aquit_Demote=0.5 if there are no Repairs for which the reported tests are Silent Where the set Silent is the set of all Repairs that are Silent for at least one reported Test-Outcome and the set Acquitted is the set of all Repairs that are Acquitted for at least one reported Test Outcome.

Supported_Occurrences$_i$=Co_Occurrence$_i$*[Aquit_Demote^AcquitCount$_i$] where AcquitCount$_i$ is the number Test Outcomes for which this Repair is Acquitted.

Supported_Occurrences$_i$=Supported_Occurrences$_i$*[Indict—Promote^IndictCount$_i$] where IndictCount$_i$ is the number Test Outcomes for which this Repair is Indicted.

Likelihood$_x$=Supported_Occurrences$_x$/Sum(Supported_Occurrences$_{i...z}$)

One final adaptation is required in order to support the case that one or more repairs have been attempted that have failed to rectify the problem. In this case, we multiply the Supported_Occurrence$_i$ value by 0.1 for any Repair$_i$ that has been attempted and has failed. This adjustment to the Supported_Occurrence$_i$ value is performed before the likelihoods for each repair is computed. The formula for this action is:

Supported_Occurrences$_i$=Supported_Occurrences$_i$*(0.1)$^N$ where $N$ is the number of times that Repair$_i$ has already been performed for discrepancy.

In prior art systems the likelihood or probability of a given repair was limited to its co-occurrence count. The process or algorithm above represents a dramatic improvement over prior systems as the probabilities are adjusted according to the effectiveness of a test results in resolving a particular repair, namely whether the indict or point toward, acquit or point away from, or are silent or provide no information with respect to a given repair. Note in the discussion below probabilities are referred to and denoted as $P_x$ or $P_i$ and so on. Above these probabilities have been referred to as likelihoods and Likelihood$_i$ and so on.

If the technician were unable to gather extra observations, it may seem reasonable to perform the repairs associated with the most likely faults identified above and continue making repairs until the observed symptoms are all cleared. In some cases this may indeed be the most reasonable approach but in many cases it is not. Consider the case in which the fault is determined to be in one of two parts. Also assume that one part is twice as likely (67%) as the second (33%) but it costs ten times as much to replace ($1000) than the second ($100). It turns out that replacing the second part first will actually lower the expected or average cost of the repair.

Strategy$_{12}$—Expected cost for replacing Part$_1$ then Part$_2$:

$1000+0.33*$100=$1033

Strategy$_{21}$—Expected cost for replacing Part$_2$ then Part$_1$:

$100+0.67*1000=$770

If this repair were repeated many times over the lifetime of the aircraft, the operator would save an average of $263 for every aircraft repaired. On any specific repair there could be two different outcomes for each strategy:

| Actual Failed Component: | Part$_1$ (67%) | Part$_2$ (33%) | NFF Rate | Average Cost |
|---|---|---|---|---|
| Strategy$_{12}$ Cost | $1000 | $1100 | Part$_1$ (33%) | $1033 |
| Strategy$_{21}$ Cost | $1100 | $100 | Part$_2$ (67%) | $770 |

This table indicates that the operator who employs Strategy$_{21}$ incurs a cost of $1100, 67% of the time and a cost $100, 33% of the time. On any given repair, the operator will incur only one of these costs. The effect of using this sort of strategy will be to reduce the overall cost or average cost to repair an aircraft or other complex system for the operator. The strategy will have the effect of increasing the No Fault Found rate for Part$_2$ but this is offset by the benefit of decreasing the No Fault Found rate of Part$_1$. The computations or concepts introduced in this last discussion are formalized in the next section.

The lowest cost to repair is the expected value of the cost incurred by the airline if the components in the ambiguity (components or other actions required to effect a repair that is a member of the set of repairs) are removed in an optimal sequence. As shown in the previous section, the optimal sequence depends on both the probability of each component in the ambiguity group and the costs of those components. The cost to repair for a specified sequence of replacements is given by:

$$CR_{X-Ci} + (1-P_i)*C_j + (1-P_i-P_j)*C_k + \ldots + P_n*C_n$$

where X is the ranked sequence of component replacements i,j, . . .n; $C_i$ is the cost of component$_i$; and $P_i$ is the probability of needing to replace component$_i$. The best case cost to repair is computed based on the sequence of replacements that minimizes this equation. The computation of the optimal sequence is computationally complex so an approximation is made in which the sequence of replacements is determined by the value of the ratio:

$$Rank_x = C_x/P_x$$

The (nearly) optimal replacement sequence can be found by ordering the replacements such that the rank$_i$<rank$_j$< . . . <rank$_n$. The rationale for the rank computation is based on the observation that the cost to repair equation for a simple two component ambiguity group or two repair set of repairs is either:

$$CR_{ij} = C_i + (1-P_i)*C_j \text{ -or- } CR_{ji} = C_j + (1-P_j)*C_i$$

depending on the replacement sequence. The cost of each repair for these sequences can be compared by drawing the conclusion that—

$$CR_{ij} < Cr_{ji} \text{ iff } C_i + (1-P_i)*C_j < C_j + (1-P_j)*C_i$$

This can be rewritten as—

$$CR_{ij} < Cr_{ji} \text{ iff } C_i + C_j - P_i*C_j < C_j + C_i - P_j*C_i$$

$$CR_{ij} < Cr_{ji} \text{ iff } P_i*C_j > P_j*C_i$$

$$CR_{ij} < Cr_{ji} \text{ iff } C_j/P_j > C_i/P_i$$

This final form shows that component$_i$ should be replaced before component$_j$ if the Rank$_i$<Rank$_j$. The computation specifically compares the cost effect of repairing each component first. In the algorithm, we use this information to compute the entire replacement sequence by ordering the replacements based on the value of the rank for each component.

Once the sequence of repairs has been determined, this evaluation can be mechanized by relatively straight-forward code in "C" or other procedural languages. It can also be implemented as an SQL query against a relational database by rewriting the cost equation as:

$$CR_x = (P_i + P_j + \ldots P_n)*C_i + (P_j + P_k + \ldots + P_n)*C_j + \ldots + P_n*C_n$$

-or- $$CR_x = (P_i*C_i + P_j*C_j + \ldots P_n*C_n) + (P_j + P_k + \ldots + P_n)*C_{i+}(P_k + \ldots + P_n)*C_j + P_m*C_m.$$

The output from this activity will be ranked list of repairs or specifically repairs actions, such as component replacements and an average cost if these components were replaced in the order ranked that is a best case or minimum average cost to repair the aircraft and the ranking, thus average cost, includes or is dependent on historical components or factors, namely the historical association between each repair and its efficacy in resolving symptoms as adjusted given the effectiveness of available test results to resolve a particular repair.

In any event next the computer or processor will determine possible tests that are consistent with the fault code; and rank these possible tests according to there respective net improvement in the average cost to repair the aircraft. Preferably an algorithm is used to rank the possible tests according to a value of the possible test that is dependent on a reduction in the average cost minus a cost to conduct the possible test. This will assist the technician in quickly making a determination as to whether and which tests to conduct. Once ranked these possible tests will preferably be displayed on the monitor so as to assist the user or technician in reviewing and selecting any further tests to perform.

When more than one repair or fault remains possible and tests are available to determine or help determine which repair(s) should be made, the algorithm below computes the effectiveness of each possible test and advises the technician according to the computations described herein after. Anytime there are tests available or possible test that may be able to break an ambiguity group or result in a smaller set of repairs, the important questions to ask are which tests are the most effective and whether they are worth the effort of performing. It turns out that the activities or calculations we have already described to find the set of repairs or Candidate Fault Conditions & Minimal Cost to Repair, can be used to evaluate remaining tests to compute their relative values. The exciting thing about this approach is it lets us compute a Dollar value for each test, which indicates the value to the operator of the information provided by the test. The program can use this information and the cost to perform each test to determine the profit or net reduction in average cost to repair the aircraft of or for each test.

Any test that costs more to run than the value of the information it provides will normally not be run. (i.e. the operator would not normally measure the voltage provided to a light bulb to determine whether the bulb should be replaced.) Any test that is more valuable than its cost will normally be run. There are exceptional cases were the operator will have access to data that is unavailable to the program and may choose a course of action different than that recommended by the program (the replacement bulb is unavailable, or I've already got the volt-meter, etc). The interactions with the user will allow the user to select the course of action that best uses all of the data they have available. The directed troubleshooting system function is to provide usable data to the operator so that they can make the optimal decision regarding fault isolation.

The calculations required to compute the value of each test are as follows:

Compute the "Cost to Repair" given the currently known symptom states (Observations corresponding to fault code and any available test results) or the expected cost from the above process and record as Cost_To_Repair$_{Baseline}$.

Compute the best case Cost to Repair as:

$$\text{Cost\_To\_Repair}_{Best} = P_i*C_i + P_j*C_j + \ldots + P_n*C_n$$

Compute the size of the current ambiguity group or size of the set of repairs) as Amb$_{Baseline}$ (Must 2 or more)

Compute the MaxImprovement=Cost_To_Repair$_{Baseline}$−Cost_To_Repair$_{Best}$

For each possible test or Test that has not already been run; (Test$_x$)

Find the outcome (Yes/No) of that test which would result in the largest ambiguity group as AmbTest$_x$ Compute the ImprovementRatio$_x$ as (Amb$_{Baseline}$−AmbTest$_x$)/(Amb$_{Baseline}$−1)

Compute the Value_of_Test$_x$ = MaxImprovement*ImprovementRatio$_x$

Compute the Profit_of_Test$_x$=Value_of_Test$_x$−Cost_of_Test$_x$

Once the Profit is computed for each test, show the user all tests where the profit is positive with the most profitable (largest Profit_of_Test$_x$) being shown first.

Then the user can select a test, perform the test and obtain a test result from the possible tests and repeat, using the fault code, the test result, and any test results from additional tests that will be selected, the identifying, the ranking the set of repairs, the determining the possible tests, the ranking the possible tests and selecting further tests until the set includes only one repair and then report this repair. Of course the user or operator can always use judgment at any point in the process of fault isolation or report the expected cost of repair at any point. Note that by including a time to repair factor with each repair or fault the same form of calculations can be used to develop an estimated time to repair figure. For the operators were time is the critical factor this can be used as the deciding factor in the fault isolation procedures.

Figure 3:
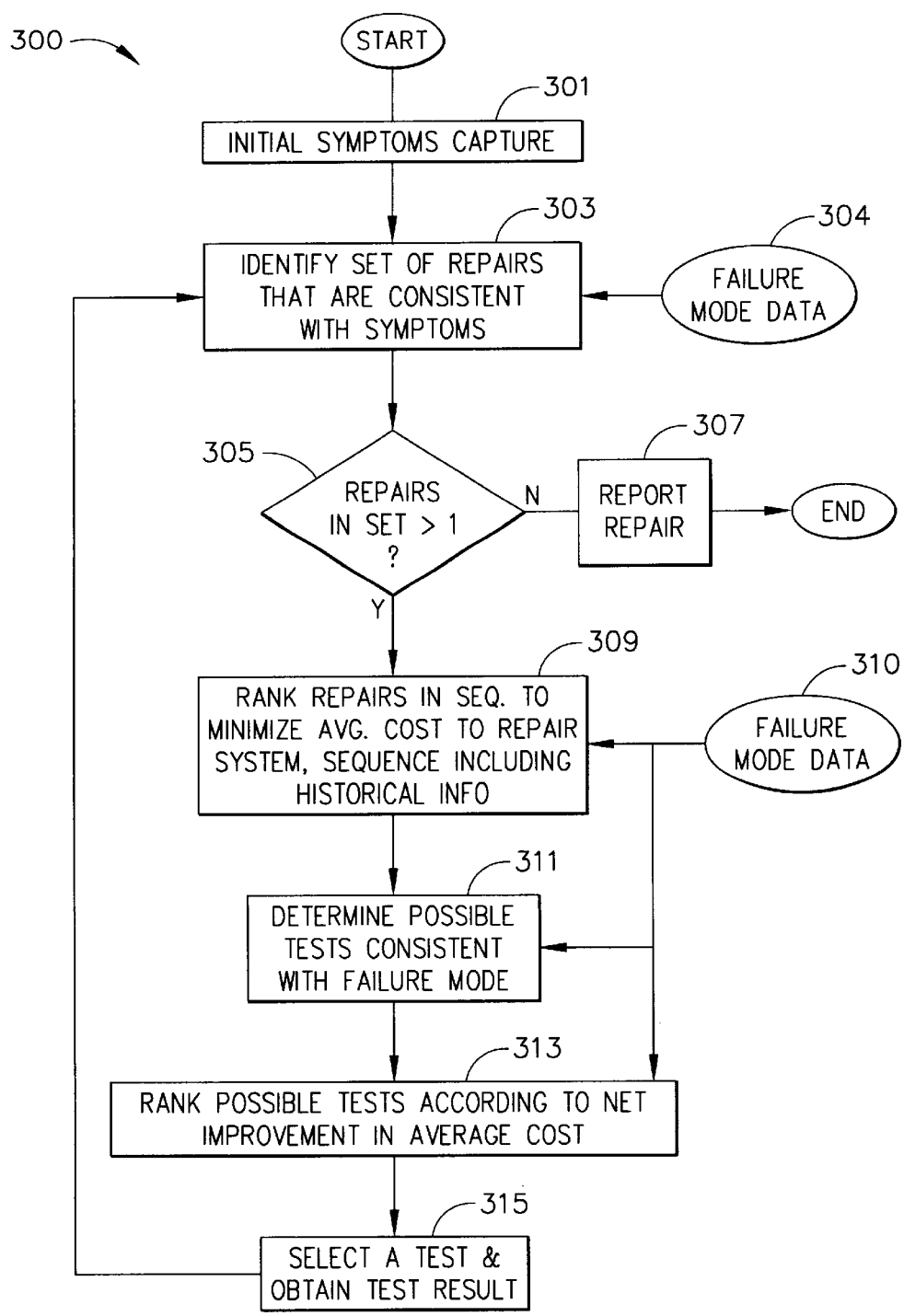
FIG. 3 depicts a flow chart of a preferred method embodiment according to the present invention.

Referring to the FIG. 3 a flow chart of a preferred method 300 embodiment of improving fault isolation for failure modes in complex systems is depicted. The method 300 is similar to the process as above implemented and would utilize similar algorithms apparent to one of ordinary skill given the above disclosed principles and concepts though this method is more general in nature and begins at 301 by capturing a set of symptoms that are consistent with a failure mode of the complex system. This capturing process preferably uses the results of a classification procedure that captures the relevant symptoms. Specifically and preferably the step of capturing the set of symptoms includes using a standard code as an indication of a set of standard observations corresponding to a subset of observable symptoms from the set of symptoms, where the standard observations are selected from a standard observations list.

At 303 the method identifies a set of repairs for the complex system that are consistent with the set of symptoms and, preferably, consistent with the standard code for the set of symptoms less any repairs that have been precluded by available test results. Similarly any possible tests, preferably, correspond to the standard code. This is accomplished with reference to the failure mode data 304 typically available from fault models or the like. At 305 we test whether more than one repair is in the set of repairs and if not this repair is reported at 307 and the process ends.

Otherwise the method undertakes ranking the repairs at 309 in a sequence that will minimize an average cost to repair the complex system, the sequence including or dependent on a historical component and reflecting the effectiveness of available test results to resolve each of the set of repairs. This is facilitated by the reference to failure mode data 310 that will be part of a fault or failure model or the like. The process of ranking the failure modes further uses an assessment of experience with said set of symptoms occurring with each repair of the set or remaining set of repairs, whether the available test results indict, acquit, or are silent with respect to each repair, and a cost associated with each repair. An algorithm such as discussed above would be the preferred approach for this ranking procedure.

Then at 311 determining possible tests that are consistent with the failure mode is performed with the aid or reference to failure mode data 310 again available from a model of faults or failures for typical complex systems. Preferably the standard code will include a set of test procedures that are related to the failure mode or repairs associated therewith. At 313 these possible tests are ranked with the reference to failure mode data 310 according to their respective net improvement in the average cost to repair the complex system. Preferably this uses an algorithm to rank the possible tests according to a value of the possible test that is dependent on a reduction in the average cost minus a cost to conduct the possible test. Again an algorithm such as discussed above would be suitable for this task. An additional preferred step 315 for the method is selecting a possible test and obtaining a test result from the possible test and repeating, using the set of symptoms, the test result, and any additional test results for tests that will be selected, the steps of identifying, ranking the set of repairs, determining the possible tests, ranking the possible tests and selecting further tests until the set includes only one repair as determined at step 305 and then reporting the repair at step 307.

This method, properly adapted by one of ordinary skill is suitable for use within a diagnostic tool and applicable to a plurality of fault models for a plurality of aircraft. A suitable way to perform the method is through a software program comprising software instructions that are arranged to run on a processor to improve fault isolation for failure modes in a complex system, the software program when installed and operating on a processor results in the processor performing a method according to FIG. 3.

The processes, discussed above, and the inventive principles thereof are intended to and will alleviate problems, such as inconsistent and time wasting diagnostics and corrective actions or records thereof caused by prior art diagnostic, maintenance and service procedures for fault isolation. Using these principles of fault isolation or repair selection will simplify service and maintenance estimations, projections, and procedures and save costs associated with inconsistent activities. Alternatively, the essential processes can be utilized to minimize time to repair if the user so desires.

Various embodiments of methods, systems, and apparatus for fault isolation with or without a corresponding fault model so as to facilitate and provide for consistent and cost effective maintenance and service programs for complex systems have been discussed and described. It is expected that these embodiments or others in accordance with the present invention will have application to many complex systems. The disclosed principles and concepts extend to these systems and specifically to methods employed for maintenance and service thereby and therein. This disclosure is intended to explain how to fashion and use various embodiments in accordance with the invention rather than to limit the true, intended, and fair scope and spirit thereof. The invention is defined solely by the appended claims, as may be amended during the pendency of this application for patent, and all equivalents thereof.

What is claimed is:

1. A method for improving fault isolation for failure modes in a complex system, the method including the steps of:

capturing a set of symptoms that is consistent with a failure mode of the complex system;

identifying a set of repairs for the complex system that are consistent with said set of symptoms;

ranking, when said set of repairs includes more than one repair, said repairs in a sequence that will minimize an average cost to repair the complex system;

determining possible tests that are consistent with said failure mode; and ranking said possible tests according to their respective net improvement in said average cost to repair the complex system.

2. The method of claim 1 further including a step of selecting a test and obtaining a test result from said possible tests and repeating, using said set of symptoms, said test result, and any additional test results for tests that will be selected, said steps of identifying, ranking said set of repairs, determining said possible tests, ranking said possible tests and selecting further tests until said set of repairs includes only one repair and then reporting said repair.

3. The method of claim 1 wherein said step of capturing said set of symptoms includes using a standard code as an indication of a set of standard observations corresponding to a subset of observable symptoms from said set of symptoms, said standard observations selected from a standard observations list, and wherein the step of determining possible tests that are consistent with said failure mode comprises determining said possible tests corresponding to said standard code and wherein said step of identifying said set of repairs includes identifying a list of repairs corresponding to said standard code for said set of symptoms.

4. The method of claim 1 wherein said step of ranking said repairs further uses an assessment of experience with said set of symptoms occurring with each repair of said set of said repairs, and further uses whether said available test results indict, acquit, or are silent with respect to said each repair, and further uses a cost associated with each repair.

5. The method of claim 1 wherein said ranking said possible tests uses an algorithm to rank said possible tests according to a value of said possible test that is dependent on a reduction in said average cost minus a cost to conduct said possible test.

6. The method of claim 1 wherein the complex system comprises an aircraft.

7. A software program comprising software instructions arranged to run on a processor to improve fault isolation for failure modes in a complex system, the software program when installed and operating on a processor resulting in the processor:

capturing a set of symptoms that is consistent with a failure mode of the complex system;

identifying a set of repairs for the complex system that are consistent with said set of symptoms;

ranking, when said set of repairs includes more than one repair, said repairs in a sequence that will minimize an average cost to repair the complex system;

determining possible tests that are consistent with said failure mode; and ranking said possible tests according to their respective net improvement in said average cost to repair the complex system.

8. The software program of claim 7 further including selecting a test and obtaining a test result from said possible tests and repeating, using said set of symptoms, said test result, and any test results from additional tests that will be selected, said identifying, said ranking said set of repairs, said determining said possible tests, said ranking said possible tests and said selecting tests until said set of repairs includes only one repair and then reporting said repair.

9. The software program of claim 7 wherein said capturing said set of symptoms includes using a standard code as an indication of a set of standard observations corresponding to a subset of observable symptoms from said set of symptoms, said standard observations selected from a standard observations list and wherein said determining possible tests that are consistent with said failure mode comprises determining possible tests that correspond to said standard code and wherein said identifying said set of said repairs includes identifying a list of repairs corresponding to said standard code for said set of symptoms.

10. The software program of claim 7 wherein said ranking said repairs further uses an assessment of experience with said set of symptoms occurring with each repair of said set of said repairs, and further uses whether said available test results indict, acquit, or are silent with respect to said each repair, and further uses a cost associated with each repair.

11. The software program of claim 7 wherein said ranking said possible tests uses an algorithm to rank said possible tests according to a value of said possible test that is dependent on a reduction in said average cost minus a cost to conduct said possible test.

12. The software program of claim 7 wherein the complex system comprises an aircraft.

13. An aircraft maintenance and operations diagnostic system for improved assistance with fault isolation for a fault condition within an aircraft based on a fault model for the aircraft, the system comprising in combination:

a user interface;

a computer, coupled to the user interface, having memory for storing software instructions and databases and a processor for;

executing said software instructions to process information to facilitate the fault isolation for the fault condition according to a fault model, the software program resulting in the computer;

capturing a fault code from a fault classification process, said fault code being part of the fault model that is consistent with the fault condition;

identifying a set of repairs for the aircraft that are consistent with said fault code;

ranking, when said set of repairs includes more than one repair, said repairs in a sequence that will minimize an average cost to repair the aircraft;

determining possible tests that are consistent with said fault code; and ranking said possible tests according to their respective net improvement in said average cost to repair the aircraft.

14. The system of claim 13 further including selecting a test and obtaining a test result from said possible tests and repeating, using said fault code, said test result, and any test results from additional tests that will be selected, said identifying, said ranking said set of repairs, said determining said possible tests, said ranking said possible tests and selecting further tests until said set of repairs includes only one repair and then reporting said repair.

15. The system of claim 13 wherein said capturing said fault code includes capturing an associated set of standard observations corresponding to a subset of observable symptoms, and wherein said standard observations are selected from a standard observations list and capturing any available test outcomes.

16. The system of claim 13 wherein said step of ranking said repairs further uses an assessment of experience with a set of symptoms, corresponding to observable symptoms associated with said fault code and any available test outcomes, occurring with each repair of said set of said repairs, whether said available test results indict, acquit, or are silent with respect to said each repair, and a cost associated with each repair.

17. The system of claim 13 wherein said ranking said possible tests uses an algorithm to rank said possible tests according to a value of said possible test that is dependent on a reduction in said average cost minus a cost to conduct said possible test.

18. The system of claim 13 further including displaying said possible tests as ranked on said user interface to facilitate reviewing and selecting a possible test.

19. The system of claim 13 further including a portal to a wide area network to provide diagnostic support for fault isolation to remote users.

* * * * *